(12) United States Patent
Sun et al.

(10) Patent No.: US 10,732,943 B2
(45) Date of Patent: Aug. 4, 2020

(54) PROGRAMMING MODEL OF NEURAL NETWORK-ORIENTED HETEROGENEOUS COMPUTING PLATFORM

(71) Applicant: BEIJING DEEPHI TECHNOLOGY CO., LTD., Beijing (CN)

(72) Inventors: Xiaoming Sun, Beijing (CN); Lingzhi Sui, Beijing (CN); Hong Luo, Beijing (CN); Yi Shan, Beijing (CN); Song Yao, Beijing (CN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/949,150

(22) Filed: Apr. 10, 2018

(65) Prior Publication Data

US 2018/0293057 A1  Oct. 11, 2018

(30) Foreign Application Priority Data

Apr. 11, 2017  (CN) .......................... 2017 1 0231894

(51) Int. Cl.
*G06F 8/41*     (2018.01)
*G06F 8/30*     (2018.01)
(Continued)

(52) U.S. Cl.
CPC .................. *G06F 8/41* (2013.01); *G06F 8/31* (2013.01); *G06F 8/315* (2013.01); *G06N 3/08* (2013.01);
(Continued)

(58) Field of Classification Search
None
See application file for complete search history.

(56) References Cited

U.S. PATENT DOCUMENTS 6,901,584 B2   5/2005   Shann
8,327,316 B2  12/2012   Chouinard
(Continued)

FOREIGN PATENT DOCUMENTS

CN   101441569 B   5/2009
CN   103124956 B   5/2013
(Continued)

OTHER PUBLICATIONS

Gpucc: An Open-Source GPGPU Compiler Jingyue Wu, et al. CGO '16, Mar. 12-18, Barcelona, Spain.
(Continued)

*Primary Examiner* — Wynuel S Aquino
(74) *Attorney, Agent, or Firm* — IPro, PLLC

(57) ABSTRACT

The disclosure provides a compilation method and system for heterogeneous computing platform, and a runtime method and system for supporting program execution on the heterogeneous computing platform. Inputting a trained neural network model to a Neural Network (NN) optimizing compiler to generate an NN assembly file corresponding to the neural network; inputting the NN assembly file to an NN assembler to generate an NN binary file corresponding to the neural network; compilation and assembling a neural network application developed by users in a high-level language using a host compiler toolchain to generate a corresponding host assembly file and a host binary file in sequence; and linking the NN binary file and the host binary file using a host linker to generate a single hybrid linking executable file. The technical solution of the present disclosure has the advantages such as good computing performance, strong scalability, strong compatibility and high flexibility.

12 Claims, 4 Drawing Sheets

(51) Int. Cl.
 *G06N 3/08* (2006.01)
 *G06N 3/10* (2006.01)
 *G06F 8/71* (2018.01)
 *G06F 8/54* (2018.01)

(52) U.S. Cl.
 CPC .............. *G06N 3/105* (2013.01); *G06F 8/54* (2013.01); *G06F 8/71* (2013.01)

(56) References Cited

U.S. PATENT DOCUMENTS

| | | |
|---|---|---|
| 8,997,113 B2 | 3/2015 | Yan |
| 9,990,187 B1 | 6/2018 | Carroll |
| 2004/0088666 A1* | 5/2004 | Poznanovic ........ G06F 17/5045 716/105 |
| 2004/0122785 A1 | 6/2004 | Brown |
| 2015/0234667 A1* | 8/2015 | Malcolm ................ G06F 9/449 717/166 |
| 2015/0242301 A1* | 8/2015 | Ciocoi ................ G06F 11/3636 717/131 |
| 2017/0132513 A1* | 5/2017 | Yu ............................ G06N 3/08 |
| 2018/0121181 A1* | 5/2018 | Seo ........................... G06F 8/52 |
| 2018/0173529 A1* | 6/2018 | Tamir ...................... G06F 9/485 |
| 2020/0026992 A1* | 1/2020 | Zhang .................... G06F 17/16 |

FOREIGN PATENT DOCUMENTS

| | | |
|---|---|---|
| CN | 105426226 | 3/2016 |
| CN | 105426226 B | 3/2016 |
| CN | 106155755 A | 11/2016 |

OTHER PUBLICATIONS

Jingyue Wu, Artem Belevich, Eli Bendersky, Mark Heffernan, Chris Leary, Jacques Pienaar, Bjarke Roune, Rob Springer, Xuetian Weng, Robert Hundt, "gpucc: An Open-Source GPGPU Compiler", 12 pages, CGO '16, Mar. 12-18, 2016, Barcelona, Spain.

* cited by examiner

PROGRAMMING MODEL OF NEURAL NETWORK-ORIENTED HETEROGENEOUS COMPUTING PLATFORM

TECHNICAL FIELD

The present disclosure relates to a heterogeneous computing platform and neural networks, and more particularly to a programming model of a neural network-oriented heterogeneous computing platform.

BACKGROUND

Artificial intelligence has been developed rapidly in recent years and has greatly affected people's lives. All countries in the world have paid high attention to artificial intelligence and have a large-scale R & D investment. Artificial neural network is the core of artificial intelligence application. Deep learning neural network algorithm is the most common artificial neural network model. Its workload is characterized in being compute-intensive (multiply-add operations at G magnitude) and data-intensive (Megabytes to hundreds of Megabytes in parameters). The computing platform based on the conventional general-purpose processor CPU cannot meet the performance requirements well. In recent years, the heterogeneous platforms for accelerating neural network computing represented by NVIDIA GPUs have become popular. The compilation toolchain and development kit packaged in CUDA SDK simplify user application development in heterogeneous CPU+GPU environment. As cost-effective acceleration solutions such as FPGAs and various deep learning ASICs (such as Google TPU) continue to emerge, it is imperative to address the following issues that CPU+FPGA/ASIC heterogeneous computing platforms face:

1. Programmability based on the popular C/C++ high-level language;
2. Reducing the neural network application development threshold, and improving the programming efficiency;
3. Optimizing the neural network structure, and compilation and generating efficient computing instructions;
4. Improving data reuse and reducing data movement between CPU and FPGA/ASIC.

Therefore, there is a need for a programming model of a neural network-oriented heterogeneous computing platform, which effectively solves various difficulties faced in the development, compilation, deployment and running stages of the neural network application under the heterogeneous environment of a CPU+neural network-specific processor.

SUMMARY

Based on the above discussion, the present disclosure focuses mainly on a series of efficient compilation and runtime support technologies for a neural network-oriented heterogeneous computing platform. More specifically, an object of the present disclosure is to provide a programming model for a neural network-oriented heterogeneous computing platform, so as to innovatively and effectively solve various difficulties faced in the development, compilation, deployment and running stages of the neural network application under the heterogeneous environment of a CPU+ neural network-specific processor.

In accordance with a first aspect, the disclosure provides a compilation method for a heterogeneous computing platform, the method comprising: inputting a trained neural network model to a Neural Network (NN) optimizing compiler to generate an NN assembly file corresponding to the neural network; inputting the NN assembly file to an NN assembler to generate an NN binary file corresponding to the neural network; compilation and assembling a neural network application developed by users in a high-level language using a host compiler toolchain to generate a corresponding host assembly file and a host binary file in sequence; and linking the NN binary file and the host binary file using a host linker to generate a single hybrid linking executable file.

In a class of this embodiment, the binary file is an ELF binary file, and the single hybrid linking executable file is a single hybrid linking ELF executable file.

In a class of this embodiment, the high-level language is C/C++.

In a class of this embodiment, the single hybrid linking executable file comprises several ELF standard executable file sections and several NN extension sections. The ELF standard executable file sections further comprise: an ELF file header, a section table, a code section, and a data section. The NN extension sections further comprise: an NN header, a code section, and a data section.

In accordance with another aspect, the disclosure provides a method for supporting program running on a heterogeneous computing platform, the method comprising: implementing the initialization operations and the runtime controls of the kernel of the neural network-specific processor through calling the high-level language Application Programming Interface (API) in the development library for the neural network-specific processor; launch the running of the hybrid linking executable file produced by the compilation method for the heterogeneous computing platform according to the first aspect of the present disclosure; loading the code section and the data section of the host in the executable file into the memory space of the host by a standard loader of the operating system; loading the code section and the data section of the neural network-specific processor in the executable file into the memory space of the neural network-specific processor by a loader of the neural network-specific processor; and executing the instructions in the code section of the host and the instructions in the code section of the neural network-specific processor sequentially in the order programmed in the neural network application.

In accordance with still another aspect, the disclosure provides a compilation system for a heterogeneous computing platform, the system comprising: a Neural Network (NN) optimizing compiler configured to parse a trained neural network model to generate an NN assembly file corresponding to the neural network; an NN assembler configured to assemble the NN assembly file to generate an NN binary file corresponding to the neural network; a host compiler configured to compile a neural network application developed by users in a high-level language to generate a corresponding host assembly file; a host assembler configured to assemble a host assemble file to generate a host binary file; and a host linker configured to link the NN binary file and the host binary file to generate a single hybrid linking executable file.

In a class of this embodiment, the binary file is an ELF binary file, and the single hybrid linking executable file is a single hybrid linking ELF executable file.

In a class of this embodiment, the high-level language is C/C++.

In a class of this embodiment, the single hybrid linking executable file comprises several ELF standard executable file sections and several NN extension sections. The ELF standard executable file sections further comprise: an ELF file header, a section table, a code section, and a data section. The NN extension sections further comprise: an NN header, a code section, and a data section.

In accordance with still another aspect, the disclosure provides a runtime system for supporting program running on a heterogeneous computing platform, the runtime system comprising: a host; a neural network-specific processor; a neural network application; a development library of the neural network-specific processor configured to package various high-level language application programming interfaces for the neural network-specific processor to be provided to the user and to be called in the development of the neural network application to implement the initialization operations and the runtime controls of the kernel of the neural network-specific processor; the compilation system for a heterogeneous computing platform described above according to the present disclosure, the system being configured to generate a hybrid linking executable file; a standard loader of the operating system configured to load the code section and the data section of the host in the executable file into the memory space of the host; a loader of the neural network-specific processor configured to load the code section and the data section of the neural network-specific processor in the executable file into the memory space of the neural network-specific processor; a host operating system; and a driver of the neural network-specific processor configured to cooperate with the host operating system so that the instructions in the code section of the host and the instructions in the code section of the neural network-specific processor are executed sequentially in the order programmed by the neural network application.

The technical solution of the present disclosure has the advantages such as good computing performance, strong scalability, strong compatibility and high flexibility.

BRIEF DESCRIPTION OF FIGURES

The present disclosure will be described below with reference to the accompanying drawings and embodiments.

DETAILED DESCRIPTION

The invention is described herein below with reference to accompanying drawings. It should be noted that the following examples are intended to describe and not to limit the invention.

Compared with a single computing platform (that is, a computing platform having only one kind of CPU processor), the present disclosure further comprises the following functional components: 1) a neural network optimizing compiler; 2) an NN assembler; 3) a heterogeneous hybrid linking ELF (Executable and Linking Format) executable file of CPU+neural network-specific processor; 4) a driver of the neural network-specific processor; 5) a runtime loader of the neural network-specific processor; and 6) a development library for the neural network-specific processor.

It should be understood by those skilled in the art that the term "a neural network-specific processor" used in the present application may also be simply referred to as "a neural network processor" or "an NN processor". Because deep learning is one of the most popular technical branches in the neural network technology, the neural network-specific processor may be implemented as a deep learning-specific processor or a deep learning processor. However, those skilled in the art should understand that there are other technical branches for the neural network, such as a Deep Neural Network (DNN). Therefore, the neural network-specific processor may also be implemented as a deep neural network-specific processor or a Deep Neural Network processor (DNN processor). That is, techniques about the "deep learning processor" or "deep neural network processor" in the aspect of compilation and runtime support in the heterogeneous computing platform are also within the scope of the present disclosure.

As mentioned below with reference to FIG. 1, the above described functional components 1), 2), and 3) provide compilation support of the neural network on the heterogeneous platform of a CPU+neural network-specific processor, namely involving a first embodiment of the present disclosure. As mentioned below with reference to FIG. 4, the functional components 4), 5) and 6) provide related program runtime support for the heterogeneous neural network application of the CPU+neural network-specific processor, namely involving a second embodiment of the present disclosure.

A First Embodiment

The function of the constituent elements in the first embodiment will be described first below with reference to FIG. 1.

Figure 1:
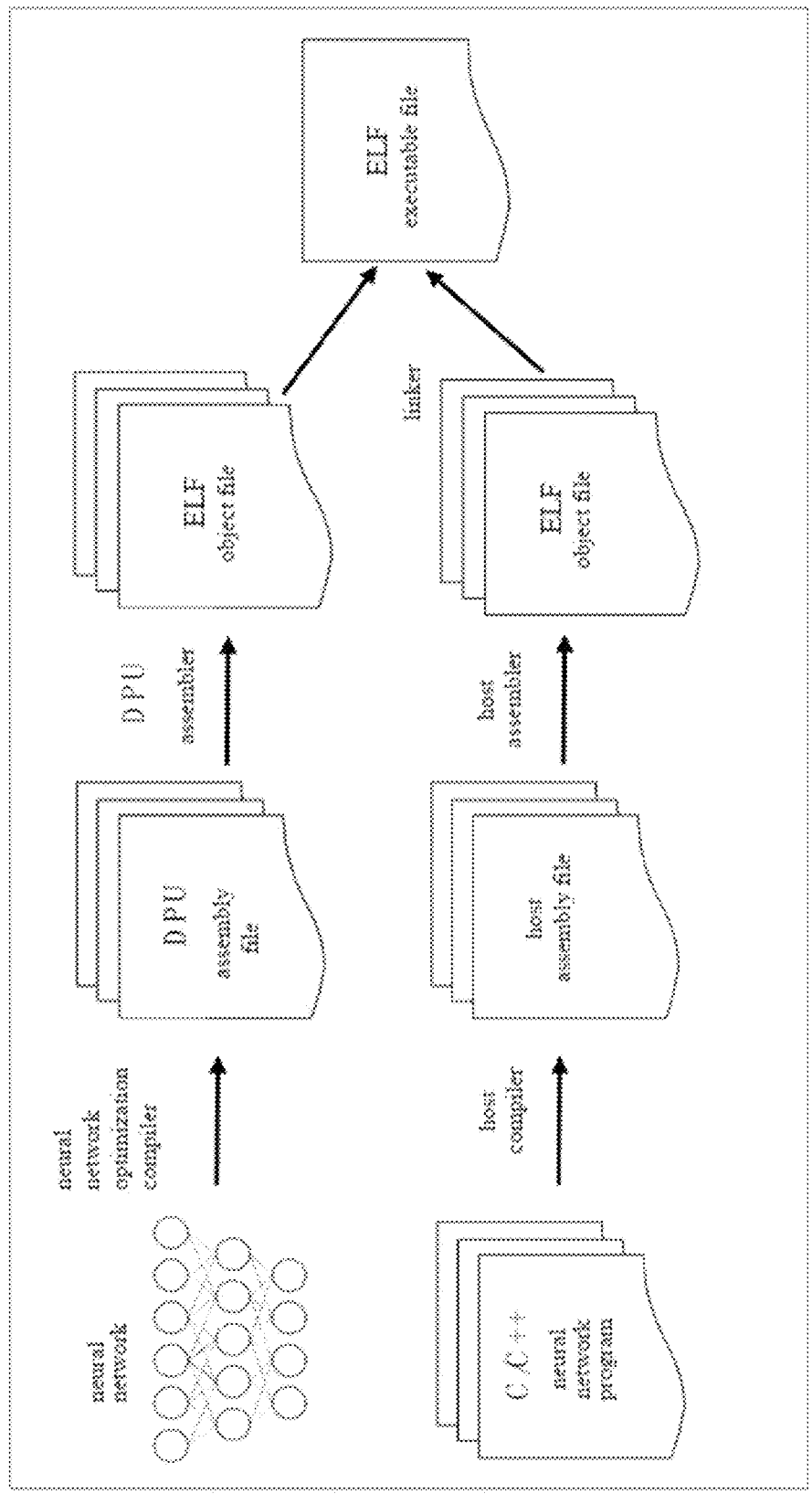
FIG. 1 is a hybrid compilation model of a heterogeneous computing platform with a CPU+neural network-specific processor.

FIG. 1 is a hybrid compilation model of a heterogeneous computing platform of a CPU+neural network-specific processor.

In FIG. 1, the Neural Network (NN) optimizing compiler (or referred to as "an NN optimizing compiler") takes the neural network model as an input and parse its topology to acquire the information of control flow and data flow in the model, on the basis of which a variety of optimizing and transformation techniques are imposed on the model. Specifically, the compiler combines computational operations between different network layers in a neural network model, reducing computational intensity. For structured and unstructured sparse networks, the compiler will eliminate unnecessary calculations and data movement caused by sparse values. In addition, the compiler will fully reuse the network parameters and feature map values stored in the on-chip memory of the neural network-specific processor to reduce the memory access bandwidth requirements, thereby reducing power consumption. The compiler outputs the NN assembly file to the NN assembler.

The NN assembler receives the NN assembly file from the NN optimizing compiler. The received NN assembly file (assembly instruction) is converted by the NN assembler to generate a corresponding binary machine code. Thereafter, the machine code and the data of the neural network-specific processor are integrated together to generate a standard ELF format binary file.

Figure 3:
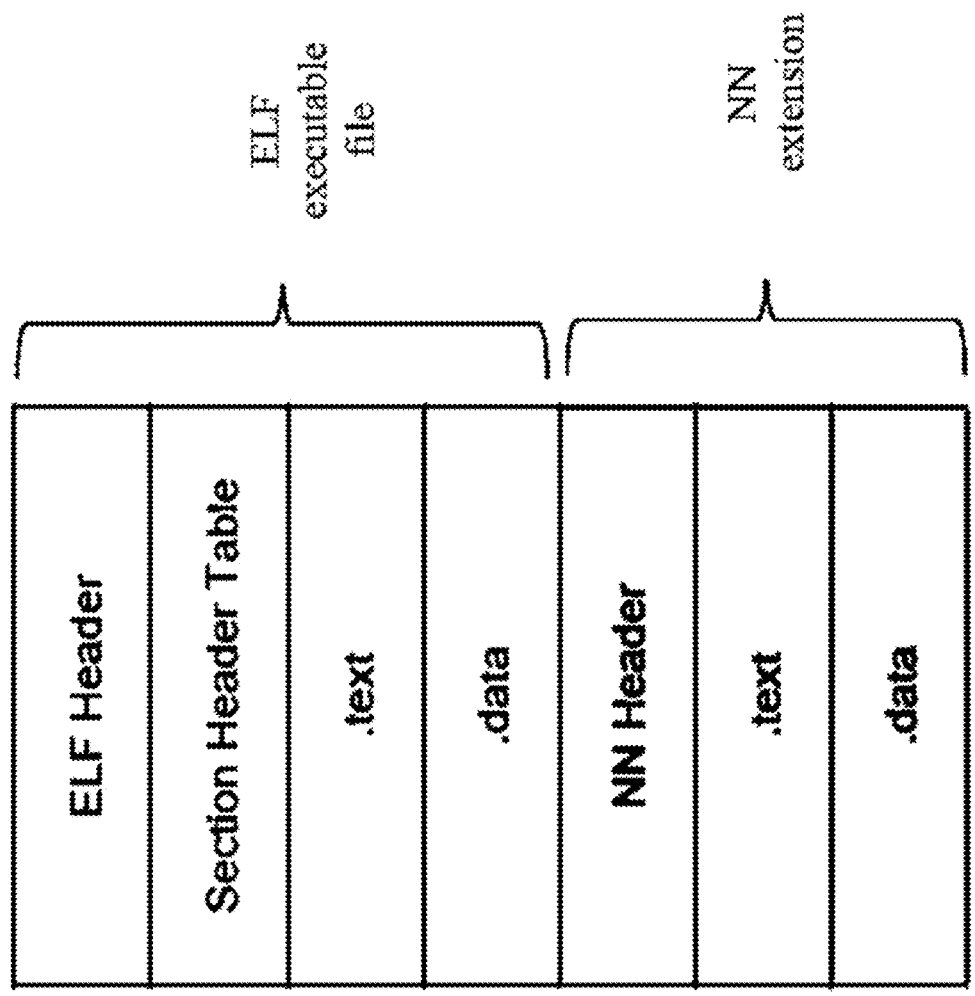
FIG. 3 is a schematic diagram of a hybrid linking ELF executable file for a heterogeneous computing platform of CPU+neural network-specific processor.

The host linker is configured to generate a heterogeneous hybrid linking ELF executable file of the CPU+neural network-specific processor. In a preferred embodiment of the present disclosure, the format of the ELF executable file may be extended to support more features of the neural network-specific processor. Specifically, the ELF binary files of the neural network-specific processor and of the host are linked together to generate a single executable file (ELF executable file), facilitating the deployment and running of the neural network application. In FIG. 1, both the ELF binary files of the neural network-specific processor and of the host are shown as ELF object files. FIG. 3 shows an example of a hybrid linking ELF executable file of a CPU+neural network-specific processor, which will be described in further detail below.

The ELF binary file of the host used by the host linker is obtained in such a way that the C/C++ neural network program is compiled by the host compiler and the generated host assembly file is compiled by the host assembler, wherein the host compiler, host assembler, and the host linker are the existing functional components in the compilation model of a host computing platform.

The working state of the compilation model according to the first embodiment of the present disclosure will be further described below from the perspective of the method steps.

Figure 2:
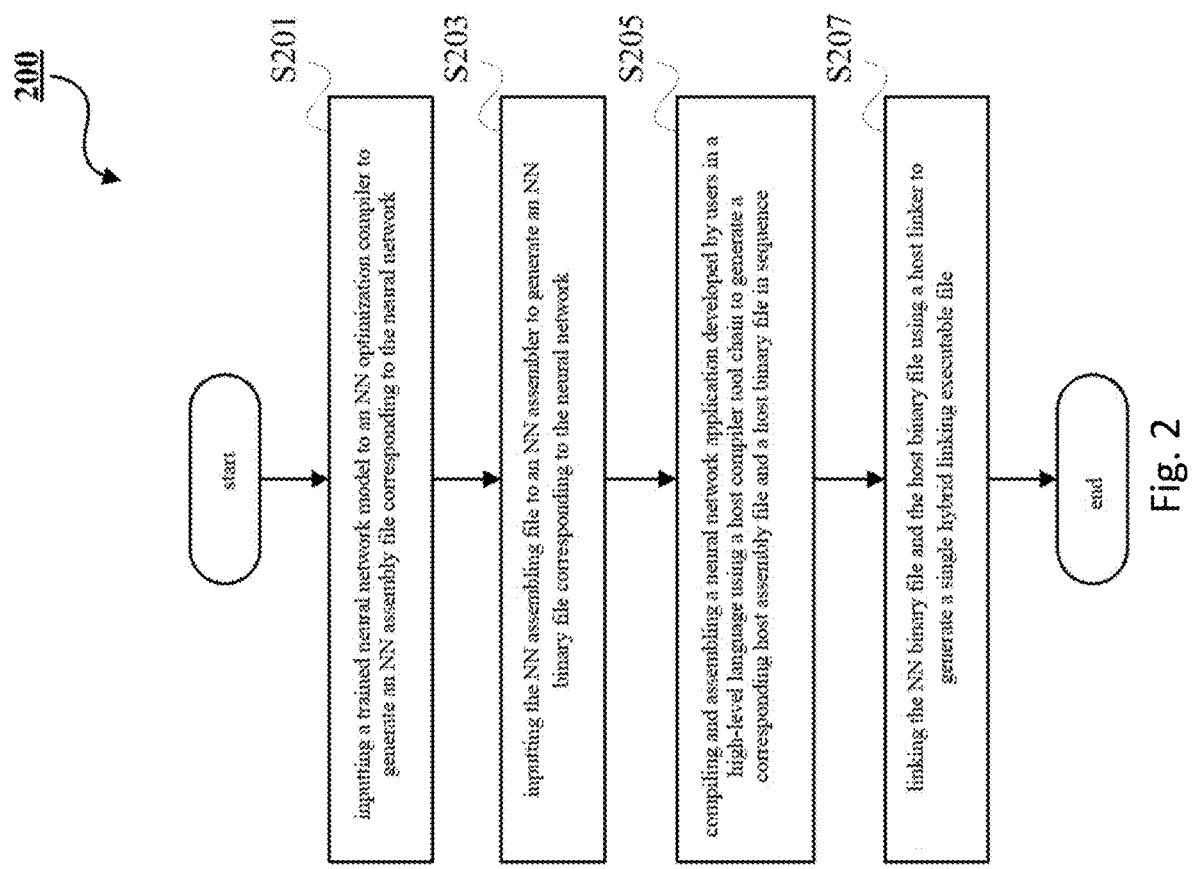
FIG. 2 is a compilation flowchart for a heterogeneous computing platform according to a first embodiment of the present disclosure.

FIG. 2 is a compilation flowchart for a heterogeneous computing platform according to a first embodiment of the present disclosure.

As shown in FIG. 2, the compilation method 200 for a heterogeneous computing platform according to a first embodiment of the present disclosure begins with step S201. At step S201, the trained neural network model is input to the NN optimizing compiler to generate an NN assembly file corresponding to the neural network.

At step S203, the NN assembly file is input to an NN assembler to generate an NN binary file corresponding to the neural network.

At step S205, a neural network application developed by users in a high-level language is compiled and assembled using a host compiler toolchain to generate a corresponding host assembly file and a host binary file in order.

In the preferred embodiment of the present disclosure, and with reference to the description of FIG. 1, the above-mentioned high-level languages are all embodied as C/C++. It should be understood by those skilled in the art that C/C++ is a high-level language that is typical and commonly used in the art, thereby increasing the programmability of the present disclosure. However, those skilled in the art should also understand that the high-level language described herein may also be other high-level languages other than C/C++, for example, including but not limited to object-oriented high-level languages such as Java, Pascal, Python, Perl, or those high-level languages that may be typical or commonly used in the programming platform prior to the present disclosure, or may be other high-level languages that may be typical or commonly used in a future programming platform that the inventors of the present disclosure can foresee.

At step S207, the NN binary file and the host binary file are linked using a host linker to generate a single hybrid linking executable file.

In the preferred embodiment of the present disclosure, and with reference to the description of FIG. 1, the above-mentioned binary files are all embodied as ELF binary files (or referred to as ELF files). It should be understood by those skilled in the art that the ELF (Executable and Linking Format) files use typical and commonly used standard file formats, thereby increasing the programmability of the present disclosure. However, those skilled in the art should also understand that the binary files described herein may also be other binary files other than the ELF files, which may be typical or commonly used in the programming platform prior to the present disclosure, or may be typical or commonly used in a future programming platform that the inventors of the present disclosure can foresee.

In addition, in a preferred embodiment of the present disclosure, the single hybrid linking executable file generated at step S207 may be a single hybrid linking ELF executable file. FIG. 3 shows an example of this.

FIG. 3 is a schematic diagram of a hybrid linking ELF executable file of a CPU+neural network-specific processor. As shown in FIG. 3, the hybrid linking executable file generated in step S207 may comprise two types of sections: ELF standard executable file sections and an NN extension sections. The ELF standard executable file sections are the same as the ordinary executable file, and further comprise: an ELF file header (shown as "ELF Header" in FIG. 3), a section table (shown as "Section Header Table" in FIG. 3), a code section (shown as ".text" in FIG. 3), and a data section (shown as ".data" in FIG. 3). The NN extension sections are an format extension to the ELF standard executable file, which are linked with the ELF standard executable file sections, and further comprise: an NN header (shown as "NN Header" in FIG. 3), a code section (shown as ".text" in FIG. 3), and a data section (shown as ".data" in FIG. 3).

Although the NN extension sections are linked after the ELF standard executable file in FIG. 3, those skilled in the art should understand that the linking form and composition of the hybrid linking ELF executable file of a CPU+neural network-specific processor may also be in the form other than those in FIG. 3. That is to say, the hybrid linking executable file according to the first embodiment of the present disclosure is not limited to the form of the example given in FIG. 3, and may be a hybrid linking executable file of a CPU+neural network-specific processor formed by any linking form and content.

Returning to FIG. 2, after the execution of step S207, the compilation method 200 may be regarded as terminating. The generated executable file may be launched and run with the support of the runtime model of the neural network-oriented heterogeneous computing platform.

In the first embodiment of the present disclosure, in addition to the above-mentioned compilation method for a heterogeneous computing platform, a compilation system for a heterogeneous computing platform is further provided.

Referring to FIG. 1 and FIG. 2, the compilation system for a heterogeneous computing platform according to a first embodiment of the present disclosure may comprise an NN optimizing compiler configured to receive a trained neural network model to generate an NN assembly file corresponding to the neural network.

The NN assembler in the compilation system is configured to receive the NN assembly file from the NN optimizing compiler to generate an NN binary file corresponding to the neural network.

On the other hand, for the host side, the host compiler of the compilation system is configured to compile a neural network application developed by users in a high-level language to generate a corresponding host assembly file. The host assembler is configured to assemble a host binary file to generate a host binary file. The high-level language may be C/C++ or other high-level languages used to increase the programmability of the system.

The compilation system still uses the host linker to link the NN binary file and host binary file, but eventually generates a single hybrid linking executable file.

As explained above in the description of FIG. 2, the binary file may be an ELF binary file, and the single hybrid linking executable file may be a single hybrid linking ELF executable file.

As mentioned earlier, the single hybrid linking executable file may comprise several ELF standard executable file sections and an NN extension sections. The ELF standard executable file sections may further comprise: an ELF file header, a section table, a code section, and a data section. The NN extension sections may further comprise: an NN header, a code section, and a data section. The example given in FIG. 3 may be referred to again. However, the single hybrid linking executable file according to the first embodiment of the present disclosure is not limited to the form of the example given in FIG. 3, and may be a hybrid linking executable file of a CPU+neural network-specific processor formed by any linking form and content.

A Second Embodiment

The programming environment of the present disclosure, namely, the program runtime support model, will be described below with reference to FIG. 4.

Figure 4:
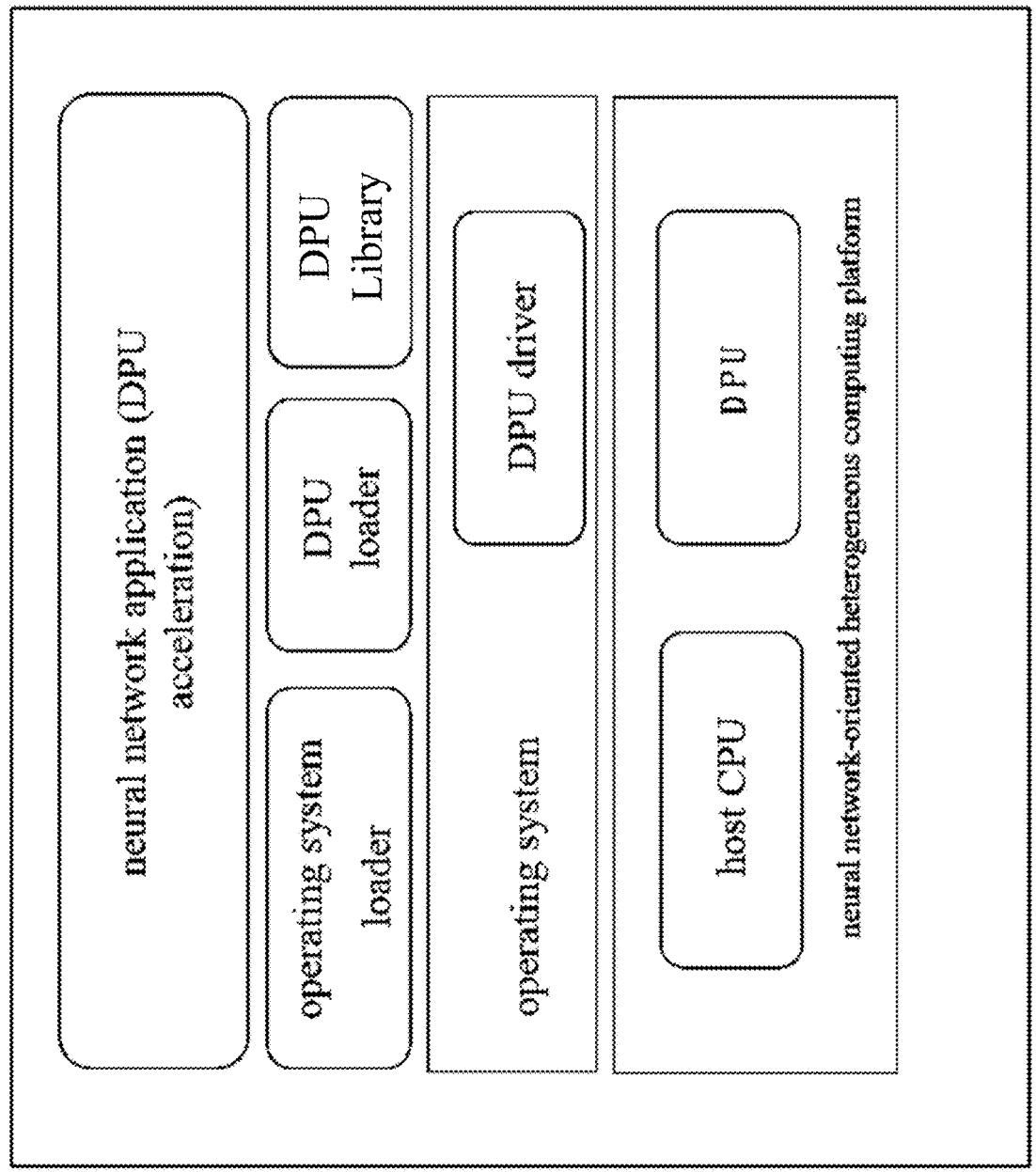
FIG. 4 is a runtime model of a heterogeneous computing platform according to a second embodiment of the present disclosure.

FIG. 4 is a program runtime support model of a heterogeneous computing platform according to a second embodiment of the present disclosure.

In FIG. 4, the neural network-specific processor is simply referred to as a DPU to be distinguished from the host CPU. It should be understood by those skilled in the art that such naming will not affect the generality of a neural network-specific processor. That is to say, in this specification and the appended drawings, "a neural network-specific processor" and "a DPU" are terms that are used interchangeably and refer to another processor on the heterogeneous computing platform that is different from the CPU.

As shown in FIG. 4, a device driver of the neural network-specific processor (shown as "a DPU driver" in FIG. 4) runs in the kernel space of the host operating system, and is responsible for dynamically managing and scheduling the runtime of the neural network-specific processor resource, is responsible for the managing and controlling the neural network code (hereinafter referred to as the kernel of the neural network-specific processor) running on the neural network-specific processor, and is responsible for managing and allocating the memory space of the neural network-specific processor.

The loader of the neural network-specific processor (shown as "the DPU loader" in FIG. 4) runs in the user space of the host operating system during runtime, and is responsible for dynamically loading and releasing the kernel of the neural network-specific processor and is responsible for repositioning the kernel code of the neural network-specific processor.

The development library of the neural network-specific processor (shown as "the DPU Library" in FIG. 4) runs in the user space of the host operating system, and is configured to package various C/C++ Application Programming Interfaces (APIs) of the neural network-specific processor to be provided to the user and to be called in the development of the neural network application, thereby improving the programming efficiency on the neural network-specific processor.

In addition, a host (or CPU), a neural network-specific processor (shown as "the DPU" in FIG. 4), a host operating system and a standard loader of the operating system (the OS Loader) that should be known to those skilled in the art are used in conjunction with the above-mentioned components serving the neural-network-specific processor to provide a runtime support environment for executing the neural network application. In other words, the acceleration of the neural network-specific processor for the neural network application is realized.

The working state of the runtime support model according to the second embodiment of the present disclosure will be further described below from the perspective of the method steps and the perspective of the system configuration, respectively.

The neural network application developed for the heterogeneous computing platform of a CPU+neural network-specific processor is mainly formed by two parts: C/C++ code, and the trained neural network model (the network topology and neural network parameters). From development to compilation and to deployment and running, the typical workflow is as follows:

At step 1, the user realizes the initialization operation and various runtime controls of the kernel of the neural network-specific processor by calling the C/C++ API programming interface of the development library of the neural network-specific processor, such as dpuInit ( ), dpuFini ( ), dpuCreateKernel ( ), dpuDestroyKernel ( ), dpuRunKernel ( ), etc., wherein the "dpu" represents the neural network-specific processor.

At step 2, the trained neural network model is input to the NN optimizing compiler to generate an NN assembly file corresponding to the neural network.

At step 3, the NN assembly file is input to an NN assembler to generate an ELF binary file corresponding to the neural network.

At step 4, the C/C++ neural network application developed by users in a high-level language is compiled using a host compiler toolchain to generate a corresponding host assembly file and a host ELF binary file.

At step 5, all the ELF binary files of the neural network-specific processor and the host are linked using a host linker to generate a single hybrid linking ELF executable file.

At step 6, the single hybrid linking ELF executable file generated after being compiled contains all the information required to run on a host and a neural network-specific processor, and has an execution manner exactly the same as a normal host ELF executable file, and may be deployed easily.

At step 7, the hybrid linking ELF executable file is started, the code section and the data section of the host in the ELF will be loaded into the memory space of the host by the standard loader of the operating system; the loader of the neural network-specific processor is responsible for loading the code section and the data section of the neural network-specific processor in the ELF into the memory space of the neural network-specific processor (wherein the memory space of the neural network-specific processor is managed by the driver of the neural network-specific processor).

At step 8, the instructions in the code section of the host and the instructions in the code section of the neural network-specific processor are executed sequentially in the order programmed by the neural network application, and the compute-intensive and data-intensive neural network algorithm is offloaded to the neural network-specific processor by the host in a form of the kernel of the neural network-specific processor for acceleration so as to achieve more efficient running.

The above process may be summarized.

In the method for runtime support of a heterogeneous computing platform according to the second embodiment of the present disclosure, the user realizes the initialization operation and the runtime control of the kernel of the neural network-specific processor by calling the high-level language Application Programming Interface (API) of the development library of the neural network-specific processor.

After the user obtains the hybrid linking executable file with the compilation method for the heterogeneous computing platform according to the first embodiment of the present disclosure, the executable file is started. The code section and the data section of the host in the executable file are loaded into the memory space of the host by a standard loader of the operating system; and the code section and the data section of the neural network-specific processor in the executable file are loaded into the memory space of the neural network-specific processor by a loader of the neural network-specific processor.

Then, the host operating system cooperates with the driver of the neural network-specific processor to execute the instructions in the code section of the host and the instructions in the code section of the neural network-specific processor sequentially in the order programmed by the neural network application.

In the second embodiment of the present disclosure, in addition to the method for runtime support of the heterogeneous computing platform described above, a runtime support system for a heterogeneous computing platform is further provided.

As shown in FIG. 4, in addition to a host, a host operating system and a standard loader of the operating system which are common in a single computing platform, the runtime support system for the heterogeneous computing platform according to the second embodiment of the present disclosure further comprises a neural network-specific processor, a neural network application, a development library of the neural network-specific processor, a compilation system, a loader of the neural network-specific processor, and a driver of the neural network-specific processor.

In the runtime support system, the development library of the neural network-specific processor is configured to package various high-level language (for example, C/C++) application programming interfaces (APIs) of the neural network-specific processor to be provided to the user and to be called in the development of the neural network application to realize the initialization operation and the runtime control of the kernel of the neural network-specific processor The compilation system in the system for supporting program running is a compilation system for the heterogeneous computing platform according to the first embodiment of the present disclosure, and is configured to generate a hybrid linking executable file.

The standard loader of the operating system is configured to load the code section and the data section of the host in the executable file into the memory space of the host; and the loader of the neural network-specific processor is configured to load the code section and the data section of the neural network-specific processor in the executable file into the memory space of the neural network-specific processor.

The driver of the neural network-specific processor is configured to cooperate with the operating system of the host to execute the instructions in the code section of the host and the instructions in the code section of the neural network-specific processor sequentially in the order programmed by the neural network application.

The innovative points mentioned in the present disclosure will be further discussed below.

At present, the design and R&D of a neural network-oriented special-purpose processor are in the flourishing initial stage. As to how to build a dedicated compiler toolchain for the neural network-oriented heterogeneous computing platform, no standards and norms have been formed in academia and industry, and no related complete technical solutions have been disclosed. Therefore, the present disclosure is advanced and innovative to a certain extent, and has the following advantages in summary.

1. Good completeness: the compilation and runtime support technology for the neural network-oriented heterogeneous computing platform proposed by the present disclosure covers various stages of the development, compilation, deployment and running of the neural network application and is a complete and practical technology solution.

2. Good performance: the neural network optimizing compiler in the present disclosure can balance the load between data reading/writing and the calculation, give full play to the degree of parallelism of the hardware resource of the neural network-specific processor, accurately unleash the computation power of the neural network-specific processor, and generate the most efficient instruction code according to the resource configuration of the calculation unit and the on-chip memory in the neural network-specific processor.

3. High flexibility: in the present disclosure, a compiler toolchain can compile various neural network models to generate efficient instruction code for the neural network-specific processor, and is not limited to a specific neural network algorithm. It is applicable to the development of various neural network applications on the neural network-specific processor platform and has a good flexibility.

4. Strong usability: a set of standard C/C++ API programming interfaces is provided to users through the development library of the neural network-specific processor, eliminating the additional burden for users to study new programming languages when compared with the manner in which CUDA or OpenCL provides heterogeneous programming by extending C/C++ syntax, so as to reduce the development threshold of the neural network-specific processor platform and improve the programming efficiency.

Various embodiments and implementations of the present invention have been described above. However, the spirit and scope of the invention are not limited to this. Those skilled in the art will be able to make more applications in accordance with the teachings of the invention, which are within the scope of the invention.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A computer configured to program a computer system, comprising: a first compiler configured to receive a model describing a neural network, combine computational operations between different network layers in the neural network to generate a first set of assembly codes representing the neural network based on the model, and eliminate unnecessary calculations and data movement caused by sparse values in the generation of the first set of assembly codes when the neural network is a sparse network; a first assembler configured to receive the generated first set of assembly codes and configured to generate a first set of object codes based on the generated first set of assembly codes; a second compiler configured to receive high-level programming language codes describing a computer application, and configured to generate a second set of assembly codes representing the computer application based on the high-level programming language codes; a second assembler configured to receive the second set of assembly codes, and configured to generate a second set of object codes based on the second set of assembly codes; a linker configured to link the first set of object codes and the second set of object codes into an executable file; wherein the computer is configured to program a special-purpose processor of a heterogeneous computing system with the first set of object codes; wherein the computer is configured to program a general-purpose processor of the heterogeneous computing system with the second set of object codes; wherein the executable file contains all information required to execute the first set of object codes based on the generated first set of assembly codes on the special-purpose processor and execute the second set of object codes on the general-purpose processor.

2. The computer of claim 1, wherein the linker is configured to link the first set of object codes and the second set of object codes into a set of executable codes, wherein the executable codes comprise a header, a section table, a first code section comprising the first set of object codes, a second code section comprising the second set of object codes, and a data section.

3. The computer of claim 1, wherein the computer is configured to cause the heterogeneous computing system to load the first set of object codes from the executable file into a memory space for the special-purpose processor and to load the second set of object codes from the executable file into a memory space for the general-purpose processor; wherein the computer is configured to cause the heterogeneous computing system to offload into the special-purpose processor the first set of object codes as part of a kernel of the special-purpose processor.

4. A method comprising: combining computational operations between different network layers in a neural network to generate a first set of assembly codes representing the neural network based on a model describing the neural network and eliminating unnecessary calculations and data movement caused by sparse values in the generation of the first set of assembly codes when the neural network is a sparse network; generating a first set of object codes based on the generated first set of assembly codes; generating a second set of assembly codes representing a computer application described in high-level programming language codes based on the high-level programming language codes; generating a second set of object codes based on the second set of assembly codes; linking the first set of object codes and the second set of object codes into an executable file; programming a special-purpose processor of a heterogeneous computing system with the first set of object codes; programming a general-purpose processor of the heterogeneous computing system with the second set of object codes; wherein the executable file contains all information required to execute the first set of object codes based on the generated first set of assembly codes on the special-purpose processor and execute the second set of object codes on the general-purpose processor.

5. The method of claim 4, further comprising linking the first set of object codes and the second set of object codes into a set of executable codes, wherein the executable codes comprise a header, a section table, a first code section comprising the first set of object codes, a second code section comprising the second set of object codes, and a data section.

6. The method of claim 4, further comprising:
causing the heterogeneous computing system to load the first set of object codes from the executable file into a memory space for the special-purpose processor and to load the second set of object codes from the executable file into a memory space for the general-purpose processor;
causing the heterogeneous computing system to offload into the special-purpose processor the first set of object codes as part of a kernel of the special-purpose processor.

7. A computer configured to program a computer system, comprising: a first compiler configured to receive a model describing a neural network, combine computational operations between different network layers in the neural network to generate a first set of assembly codes representing the neural network based on the model, and reuse network parameters and feature map values stored in an on-chip memory of special-purpose processor of a heterogeneous computing system in the generation of the first set assembly codes to reduce memory access bandwidth requirements and power consumption; a first assembler configured to receive the generated first set of assembly codes and configured to generate a first set of object codes based on the generated first set of assembly codes; a second compiler configured to receive high-level programming language codes describing a computer application, and configured to generate a second set of assembly codes representing the computer application based on the high-level programming language codes; a second assembler configured to receive the second set of assembly codes, and configured to generate a second set of object codes based on the second set of assembly codes; a linker configured to link the first set of object codes and the second set of object codes into an executable file; wherein the computer is configured to program the special-purpose processor of the heterogeneous computing system with the first set of object codes; wherein the computer is configured to program a general-purpose processor of the heterogeneous computing system with the second set of object codes; wherein the executable file contains all information required to execute the first set of object codes based on the generated first set of assembly codes on the special-purpose processor and execute the second set of object codes on the general-purpose processor.

8. The computer of claim 7, wherein the linker is configured to link the first set of object codes and the second set of object codes into a set of executable codes, wherein the executable codes comprise a header, a section table, a first code section comprising the first set of object codes, a second code section comprising the second set of object codes, and a data section.

9. The computer of claim 7, wherein the computer is configured to cause the heterogeneous computing system to load the first set of object codes from the executable file into a memory space for the special-purpose processor and to load the second set of object codes from the executable file into a memory space for the general-purpose processor; wherein the computer is configured to cause the heterogeneous computing system to offload into the special-purpose processor the first set of object codes as part of a kernel of the special-purpose processor.

10. A method comprising: combining computational operations between different network layers in a neural network to generate a first set of assembly codes representing the neural network based on a model describing the neural network and reusing network parameters and feature map values stored in an on-chip memory of a special-purpose processor of a heterogeneous computing system in the generation of the first set of assembly code; generating a first set of object codes based on the generated first set of assembly codes; generating a second set of assembly codes representing a computer application described in high-level programming language codes based on the high-level programming language codes; generating a second set of object codes based on the second set of assembly codes; linking the first set of object codes and the second set of object codes into an executable file; programming the special-purpose processor of the heterogeneous computing system with the first set of object codes; programming a genera-purpose processor of the heterogeneous computing system with the second set of object codes; wherein the executable file contains all information required to execute the first set of object codes based on the generated first set of assembly codes on the special-purpose processor and execute the second set of object codes on the general-purpose processor.

11. The method of claim 10, further comprising linking the first set of object codes and the second set of object codes into a set of executable codes, wherein the executable codes comprise a header, a section table, a first code section comprising the first set of object codes, a second code section comprising the second set of object codes, and a data section.

12. The method of claim 10, further comprising:

causing the heterogeneous computing system to load the first set of object codes from the executable file into a memory space for the special-purpose processor and to load the second set of object codes from the executable file into a memory space for the general-purpose processor;

causing the heterogeneous computing system to offload into the special-purpose processor the first set of object codes as part of a kernel of the special-purpose processor.

* * * * *